Figure 1:
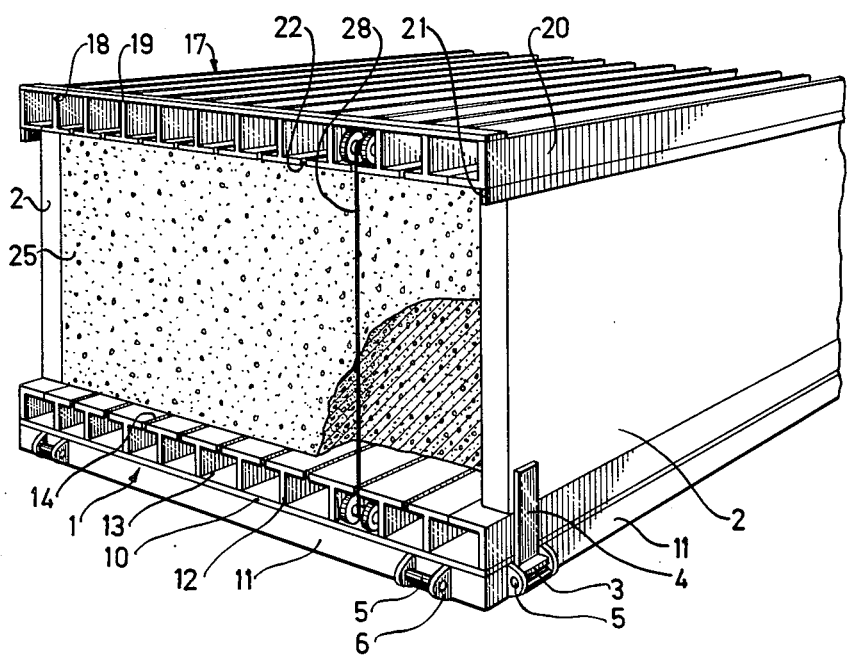

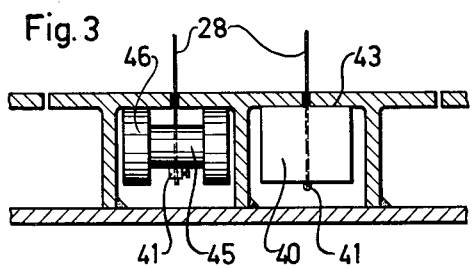
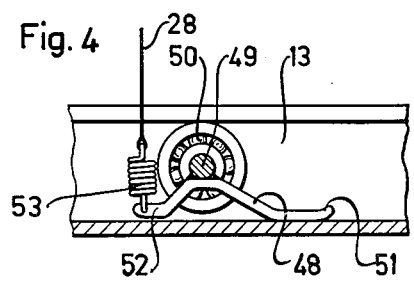
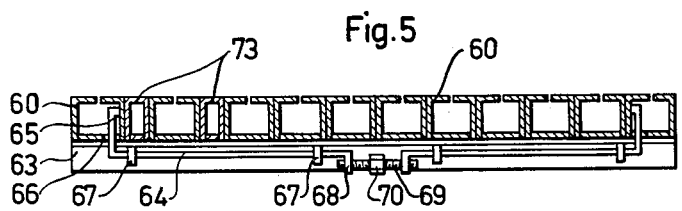
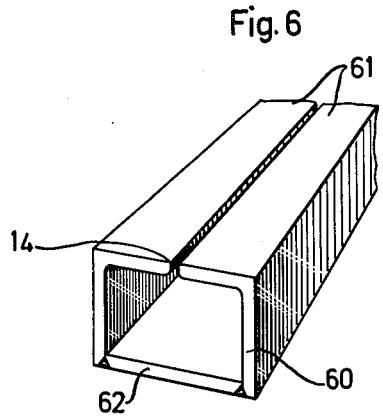

United States Patent Office 2,978,777
Patented Apr. 11, 1961

2,978,777

APPARATUS FOR MAKING A PLURALITY OF VERTICAL CUTS THROUGH LIGHT-WEIGHT CONCRETE

Bengt Orvar Carlsson and Kurth Eklund, Skovde, Sweden, assignors to Durox International Societe Anonyme, a company of Luxembourg Filed Feb. 14, 1956, Ser. No. 565,483

Claims priority, application Sweden Feb. 15, 1955

4 Claims. (Cl. 25—108)

This invention relates to a mould, particularly for the production of light weight concrete intended for steam curing, and being constructed so as to permit the cutting up of the moulded, semi-plastic body in a comparatively simple manner and with highest accuracy.

Previous devices for the cutting up of light weight concrete in most cases have been arranged to cut up the semi-plastic light weight concrete body by means of cutting members working all over the length or the width of the mould. The cutting members then pierce their way through the moulded body either horizontally and parallel to the support of the body, so as to form bricks resting one upon the other, or vertically through the light weight concrete body from the surface thereof down to the support. As the moulds used are normally considerably wider and longer than they are high a cutting up by means of cutting members extending from the bottom of the mould to the surface of the moulded mass would mean that considerably shorter cutting threads might be used, and thus that a higher degree of accuracy might be obtained.

Recently, such a cutting device has been developed. In this case the bottom part of the mould consists of a great number of flat sections, each of which may be lowered from the solidifying light weight concrete body and thus permit the cutting member to pass beneath the moulded body. However, a mould of this design is very expensive, and if any of the thread-shaped cutting members would break it is quite a complicated process to replace it. When cutting up long elements, requiring moulds of considerable length, another drawback is encountered inasmuch as the bottom of the mould does not provide any rigidity in the longitudinal direction, and, therefore, heavy longitudinal reinforcements will be necessary.

An object of the present invention is to permit cutting up by means of vertical cutting members and thereby to avoid the drawbacks referred to above. According to the invention this is realized by means of a mould, having in the bottom thereof a number of slots disposed in a desired cutting pattern, and thread or strip shaped cutting members extending substantially vertically and adapted to be moved progressively and longitudinally along said slots from one end thereof to the other, and a locking or securing means for the cutting member, movable adjacent the lowermost opening of the slot longitudinally thereof. Conveniently the bottom of the mould is composed of a system of interconnected bodies, each having a longitudinal duct and a slot through which the cutting thread may pass through the upper part of the mould bottom when stretched from the bottom of the mould to the surface of the mass poured into the mould.

The invention will now be described with reference to a few embodiments illustrated in the attached drawing, it being understood, however, that the invention is not limited to the embodiments so described.

Figure 2:
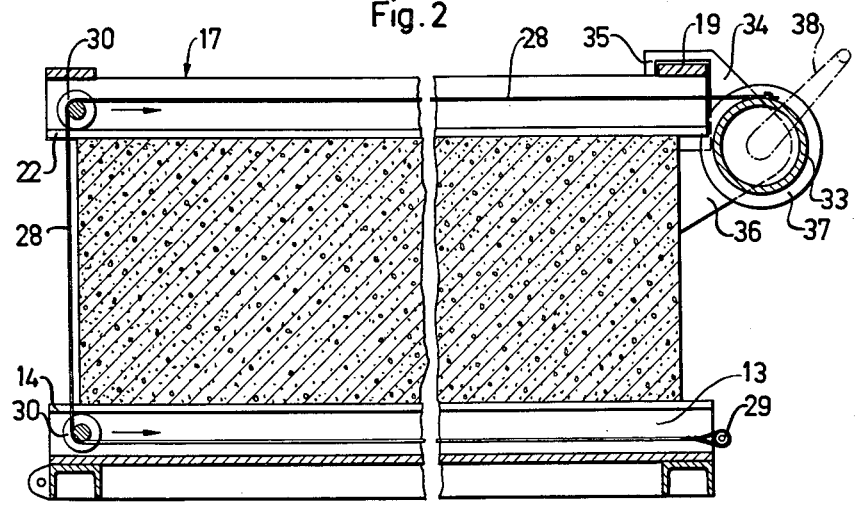

In the drawing:

Fig. 1 is a perspective view of one end of a mould having a unitary bottom structure and a unitary top cutting structure, the end wall being removed, Fig. 2 is a longitudinal section of a mould as illustrated in Fig. 1, Figs. 3 and 4 illustrate different types of wire securing means, Fig. 5 is a cross sectional view of the bottom structure of a mould consisting of a plurality of separate bottom sections, and Fig. 6 shows a perspective view of the end portion of one bottom section as illustrated in Fig. 5.

The mould consists of a bottom structure generally designated by reference numeral 1, two side walls 2 and two end walls (not shown), the side and end walls being hinged to a frame 11 of the bottom structure by open claw members 3 secured to the walls by plates 4 welded to the walls and pins 5 secured to the frame 11 by means of small brackets 6. The bottom structure consists of a bottom plate 10 resting upon the frame 11 and T-shaped members 12 welded to the bottom plate 10 so as to form a plurality of longitudinal channels 13 opening upwardly through slots 14 wide enough for permitting the cutting member to pass therethrough with not too much clearance.

The mould is also provided with a top cutting structure generally referred to by reference numeral 17. As illustrated this structure is made from a plurality of T-irons 18 welded upside down to the under side of transversal beams 19 secured at their ends to L-irons 20 forming the sides of the top structure. The side irons 20 are provided with downwardly extending flanges 21 adapted in co-operation with the side walls 2 to hold the top structure in correct position in relation to the bottom structure. The T-irons are spaced so as to form slots 22 similar to the slots 14 in the bottom structure. The top structure 17 could of course be designed in the same way as the bottom structure but the structure described is much lighter and is therefore to be preferred. The bottom structure could be made similar to the described top structure but would, as a rule, then be too weak for supporting the relatively heavy plastic body 25.

The cutting means illustrated in Figs. 1 and 2 consists of one or more wires 28. Each wire is secured to a rod 29 at the one end of the bottom structure and passed through a channel 13 to a cutting member holder in the form of a roller 30 at the other end of the channel. From there it is passed vertically through a slot 14 to another roller 30 arranged over one of the slots 22 in the top structure and from this roller 30 it is passed horizontally back to the first end of the mould. At this end the wire is secured to the periphery of a winding cylinder 33 rotatably secured to brackets 34 which are removably attached to the top structure by hooks 35 engaging the beam 19, foot portions 36 of the bracket engaging the end surfaces of the side walls 2. The cylinder 33 is provided with a flange 37 at each end and a crank 38 for rotating the cylinder.

In operation for the manufacture of light weight concrete an aqueous slurry of ground ingredients, such as silicious and calciferous material and aluminium powder, shall be poured into the mould having its side and end walls fitted. Due to the gas evolution (of hydrogen) the slurry poured into the mould raises and after some time it sets to form a plastic body 25. As a rule the slurry is so low in viscosity that it will have a tendency to penetrate through the slots 14 and more or less obstruct the free passage of the rollers 30 in the channels 13. Therefore, it is advantageous to block the slots in one way or the other. For this purpose molten paraffin, for instance, may be sprayed onto the bottom structure. As the bottom is relatively cold the paraffin will solidify and cover the slots so that the slurry will not penetrate the slots as long as the temperature is below the melting point of the paraffin. During the setting process the temperature raises and the paraffin may melt but the setting of the body 25 has then proceeded sufficiently for rendering the body too stiff for penetrating the slots. Paraffin is also good for preventing the body 25 from sticking to the bottom after the stream curing process. Paraffin may be replaced by any similar substance that solidifies upon spraying on to the cold bottom and is soft enough to permit the cutting means to perform the cutting after the moulded body has set. Alternatively dry powder of ground ingredients or some other stuff may be spread over the bottom before pouring the slurry into the mould. This powder will increase the viscosity of the bottom layer of the filling so as to prevent penetration.

According to the invention it may be preferred, however, for this purpose to use inflatable hoses in the channels 13. When inflated the hoses will cover the lower openings of the slots 14 so that the slurry can only fill up the slots but not penetrate into the channels 13. It is also possible to insert strips or bands in or, possibly, on the slots.

When the body 25 has set and shall be cut, the cutting means are put in the position shown in Fig. 2 and the crank 38 is operated so that the rollers 30 will move towards the crank end of the mould. It is preferred that the rollers are not too easily moved but are retarded by the friction against the paths in the bottom and top structures, respectively, because thereby the part of the wire 28 extending between the rollers 30 will be kept more straight than would be the case if the rollers are easily moved, in which case the part between the rollers would be much curved and the cutting thereby less accurate.

The roller member 30 in the bottom structure may be replaced by a securing member at which the wire 28 is secured so that the part of the wire between roller 30 and rod 29 can be dispensed with. Various modifications of such securing means are illustrated in Figs. 3 and 4. The most simple execution is a sliding body 40 to which the wire 28 is secured by a nut 41 or the like fixed to the end of the wire passed through a boring in the body. The friction of the body 40 against the path 43 in the roof of the bottom structure may be adjusted by varying the abutment surface of the body 40, for instance, by chipping away a portion of the surface. A somewhat more complicated securing member is shown in Fig. 3 in the channel adjacent to that housing body 40. This securing member consists of a shaft 45 carrying two rollers 46 rotatable on the shaft. The wire 28 is secured to the shaft by a nut 41 much in the same way as described with reference to the sliding body 40.

The securing means illustrated in Fig. 4 comprises a holder 48 secured to a shaft 49 carrying two ball bearings 50 adapted to engage the roof portion of the channel 13 while the front end 51 of the holder engages the bottom of the channel whereas a rearwardly projecting arm 52 of the holder has a spring 53 to which the wire is secured. By this arrangement the wire becomes resilient and in the cutting operation the wire can be given reciprocating or sawing movement. Alternatively the arm 52 may be resilient, for instance be made of spring steel, whereby the spring 53 can be dispensed with.

The cutting operation can be facilitated by vibrating the wire 28.

The winding cylinder can, of course, be attached to the bottom structure instead of to the top structure and the wire then be secured at the latter.

In Fig. 5 an alternative bottom structure is illustrated. In this case the structure is composed of a plurality of separate bottom sections 60, one of which being shown perspectively in Fig. 6. Such a section may be made by welding two L-irons to a plate iron 62 as shown in Fig. 6 so that a slot 14 is formed between the two opposing flanges of the L-irons. It is of course possible instead to make the sections from two U-irons placed flange to flange by welding together two of the opposing flanges and if necessary chipping a slot between the two other opposing flanges. The bottom sections are held by two or more transversal supporting beams 63, preferably in the form of angle irons, and are clamped together in the horizontal plane by two or more pairs of clamping members 64 supported by holders 67 secured to the bottom surfaces of the supports 63. The clamping members 64 have at one end arms 65 extending through openings 66 in the bottoms of the extreme bottom sections 60 to engage the inner walls thereof and at their other ends ears 68 provided with threads for a screw 69 combining said ears. The screw is in the middle shaped as a nut 70 and the threads on the one side thereof have opposite direction to those on the other side so that upon rotating the screw in one direction both clamps are pulled and the sections are clamped. The clamping is released upon turning of the screw in opposite direction. The embodiment with separate sections has i.e. the advantage that in case of need for repair only that on those sections injured have to be taken away from the production.

As will be clearly understood from the above description the plastic body 25 is subdivided by the cutting means into longitudinal elements. For some purposes no further cutting is required, as for the manufacture of roof plates or wall sections. If, however, smaller blocks, such as building blocks, shall be manufactured the elements cut out as described have to be cut in a direction perpendicular to the cutting direction as described. Such transversal cutting is preferably carried out in a manner known per se.

The thickness of the elements will be determined by the distances between the slots 14 and 22, respectively. As a rule the standard thicknesses are 10, 12.5, 15, 17.5, and 20 centimeters. Therefore it is practical to construct the unitary bottom and top structures of Fig. 1 so that some intervals between the slots are 5 centimeters and some 7.5 centimeters, e.g. in sequences of 5, 5, 5, 5, 7.5 centimeters. With the sectional structure of Fig. 5 it is quite easy to obtain any of the thicknesses if the sections are 5 centimeters wide and have the slot exactly in the centre. For obtaining the 12.5 and 17.5 dimensions one inserts blanks i.e. non-slotted spacer sections 73 having a width of 2.5 centimeters. It is obvious that this embodiment may be preferred to that with unitary sections if varying demands of plate or block thicknesses prevail.

To the advantages of the invention obvious from the above to those skilled in the art it might be added that the present open bottom structure improves considerably the admissibility of the steam and heat to the interior of the bulk of the set and cut bodies during the steam curing in autoclaves.

What we claim is:

1. Apparatus for making a plurality of parallel spaced vertical cuts through a moulded mass of light-weight concrete comprising parallel spaced top and bottom walls between which the mass is positioned for cutting, said top and bottom walls each being provided with a plurality of parallel spaced longitudinally extending slots, the slots in said bottom wall being located directly below correspondingly positioned slots in said top wall, means providing top and bottom guide channels individual to said slots in said top and bottom walls, said top guide channels being located above said top wall and said bottom guide channels being located below said bottom wall, top guide members individual to and displaceable longitudinally in said top guide channels, bottom guide members individual to and displaceable longitudinally in said bottom guide channels, said top and bottom guide members being in vertical alignment and located initially at one end of said guide channels adjacent one end face of the mass to be cut, cutting members of wire like material individual to and located in each pair of vertically aligned slots in said top and bottom walls, each of said cutting members including a vertical cutting portion extending between the corresponding top and bottom guide members, one end of said vertical cutting portion being anchored to one of said guide members and the other end of said vertical cutting portion being passed over the other guide member and extended longtiudinally to the opposite end of the corresponding guide channel in the vertical plane containing the slot therein, and means applying a pulling force to the longitudinally extended portions of said cutting members thereby to cause the vertical portions thereof to be tensioned and to cut vertically through said mass simultaneous with longitudinal displacement of said top and bottom guide members.

2. Apparatus as defined in claim 1 for cutting a moulded mass wherein each of said guide members to which one end of the corresponding cutting member is anchored is constituted by a roller.

3. Apparatus as defined in claim 1 for cutting a moulded mass wherein each of said guide members to which one end of the corresponding cutting member is anchored is constituted by a slidable block.

4. Apparatus as defined in claim 1 for cutting a moulded mass wherein the anchored end of each of said cutting members includes a spring.

References Cited in the file of this patent

UNITED STATES PATENTS

| | | |
|---|---|---|
| 1,027,972 | Ashton | May 28, 1912 |
| 1,405,671 | Crozier | Feb. 7, 1922 |
| 1,751,264 | Cross et al. | Mar. 18, 1930 |
| 1,864,921 | Mayer | June 28, 1932 |
| 2,158,667 | Rieck et al. | May 16, 1939 |
| 2,451,027 | Gano | Oct. 12, 1948 |
| 2,694,846 | Olsson et al. | Nov. 23, 1954 |

FOREIGN PATENTS

| | | |
|---|---|---|
| 848,620 | Germany | Sept. 4, 1952 |
| 3,394 | Great Britain | Sept. 4, 1897 |
| 6,526 | Great Britain | Mar. 17, 1904 |
| 63,739 | Sweden | Sept. 13, 1927 |